United States Patent [19]

Suzaki

[11] 3,877,656

[45] Apr. 15, 1975

[54] REEL SUPPORTING DEVICE IN INSTRUMENTS LOADED WITH REELS

[75] Inventor: Kuniyoshi Suzaki, Tokyo, Japan

[73] Assignee: Canon Kabushiki Kaisha, Tokyo, Japan

[22] Filed: Feb. 27, 1973

[21] Appl. No.: 336,365

[30] Foreign Application Priority Data

Mar. 3, 1972 Japan .......................... 47-26399[U]
Mar. 3, 1972 Japan .......................... 47-26400[U]
June 30, 1972 Japan .......................... 47-77437[U]

[52] U.S. Cl. ............... 242/68.3; 242/197; 242/205; 352/72; 352/73

[51] Int. Cl. ............................................ B65h 17/02

[58] Field of Search ................. 352/72, 73, 78, 157; 242/68.3, 181, 197, 205; 287/103 A

[56] References Cited

UNITED STATES PATENTS 2,120,623 6/1938 Oxford et al. .................... 287/103 A
2,448,547 9/1948 Purdy .............................. 287/103 A
3,386,675 6/1968 Thomsen ........................... 352/78 R
3,468,498 9/1969 Bunting ............................ 352/73 X
3,470,524 9/1969 Culver ........................ 287/103 A X
3,603,527 9/1971 Prelletz ............................... 352/157
3,664,608 5/1972 Easterly et al. .................... 352/73 X
3,669,383 6/1972 Kadowaki ......................... 352/73 X
3,679,244 7/1972 Reddy ......................... 287/103 A X

*Primary Examiner*—Samuel S. Matthews
*Assistant Examiner*—Alan Mathews
*Attorney, Agent, or Firm*—Flynn & Frishauf

[57] ABSTRACT

A reel supporting device usable with a motion picture projector adapts the projector to be selectively loaded with a film cartridge having a reel spindle and an open reel having no such reel spindle. The reel supporting device includes a reversibly mountable reel spindle and a reel supporting member on which the reel spindle is mounted. The reel spindle has a cylindrical portion for fitting into a reel spindle receiving hole, and a mounting portion adapted to be mounted to the supporting member. The mounting portion is formed with engaging members for accomplishing a bayonet coupling. The reel spindle may be mounted on the supporting member with the cylindrical reel supporting portion of the spindle projecting outwardly from the supporting member or with the cylindrical portion stored away in the mounting hole of the supporting member.

8 Claims, 8 Drawing Figures

REEL SUPPORTING DEVICE IN INSTRUMENTS LOADED WITH REELS

BACKGROUND OF THE INVENTION

1. Field of the Invention

This invention relates to a reel supporting device which is applicable to motion picture projectors or other instruments using reels.

2. Description of the Prior Art

Motion picture projectors using cartridges are grouped into two types, one of which uses cartridges having a reel spindle therein and the other type uses cartridges having no reel spindle therein but utilizing a spindle provided in the projector and engageable with the reel hub of the cartridge.

A cartridge with its own reel spindle usable with the latter type of motion picture projectors is disclosed in British Patent 1,252,386, for example. In using the cartridge of this type, it has been difficult to drive the reel spindle to thereby rotate the reel. For this reason, reel drive means has been separately provided to engage the outermost rim of the flanged portion of the reel within the cartridge to thereby drive the reel at a predetermined number of revolutions. Thus, the motion picture projectors employing such cartridges need not be provided with a spindle for driving the reel, but only need be provided with a positioning member for positioning the cartridge in place in the projector and a member for holding the cartridge in such position.

Where it is desired to load such a projector with a roll of motion picture film wound on an open reel or the like having no reel spindle of its own, it would be necessary to provide the projector with a reel spindle specially designed for use with the open reel because the projector lacks a reel spindle engageable in the center hole of the open reel to support the open reel.

Published West German Patent Application 2,017,885, for example, discloses a motion picture projector which can accomplish motion picture projection by using a reel spindle of the above-described detachable type cooperable with an open reel. The reel spindle of this detachable type is useful when open reels are used, but it must be removed when a cartridge is used. The reel spindle thus removed may be subject to the risk of sometimes being missing, which would cause inconveniences in the future us of the motion picture projector.

Further, Published German Patent Application 1,947,149 shows a motion picture projector provided with a reel spindle which, when using a cartridge, may be urged inwardly from the cartridge receiving surface by the force of a spring but which, when using an open reel, may be projected outwardly by that spring so as to fit into the spindle receiving hole in the open reel. Such a reel spindle, when in its projected position, functions not only to support the open reel but also to connect to drive means to rotate the open reel, and this is structurally complex enough to make the projector higher in cost.

SUMMARY OF THE INVENTION

It is an object of the present invention to overcome the above-noted disadvantages peculiar to the prior art and provide a reel spindle of very simple construction which is usable with both of the above-described two types of motion picture projectors.

It is another object of the present invention to provide a reel supporting device in a motion picture projector which includes a reel spindle comprising a cylindrical portion adapted to be received into a reel spindle receiving hole in an open reel, and a mounting portion adapted to be mounted to the projector and provided with at least two retainer members spaced apart in the direction of mounting; and a reel supporting member provided with a reel spindle mounting hole having its inner wall formed with a mating member adapted, when the reel spindle is mounted, to be held between said at least two retainer members so as to permit a predetermined extent of insertion and rotation of the spindle relative to the supporting member; whereby when a cartridge having a reel spindle of its own is used the spindle of the device may be mounted to the supporting member with the cylindrical portion thereof fully inserted into the mounting hole in the reel supporting member, and when an open reel or other film winder having no reel spindle of its own is used the reel spindle may be mounted with said cylindrical portion thereof projected outwardly from the reel supporting member.

Other objects and features of the present invention will become fully apparent from the following detailed description taken in conjunction with the accompanying drawings.

DESCRIPTION OF THE PREFERRED EMBODIMENTS

Figure 1:
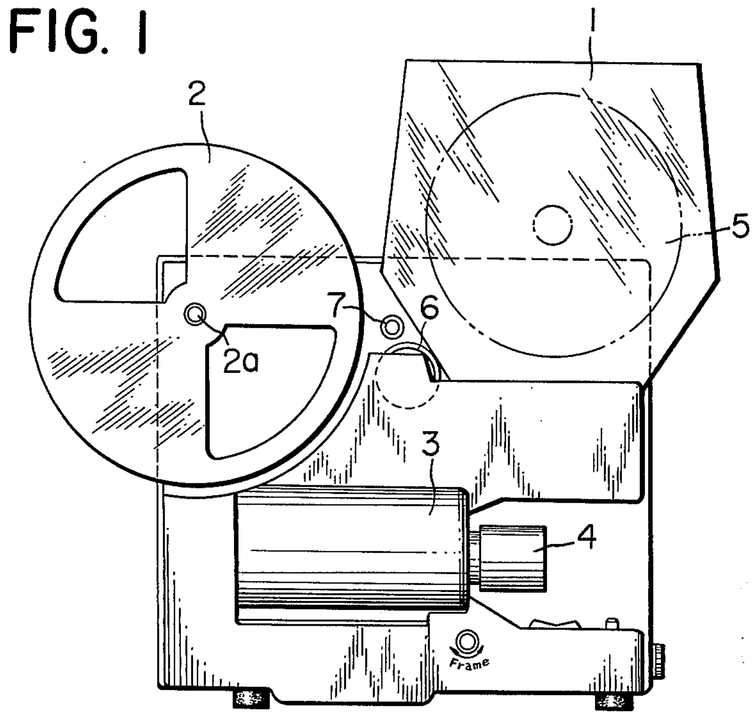
FIG. 1 is a pictorial front view of the motion picture projector to which the reel supporting device of the present invention is applicable, showing the projector as loaded with a cartridge at the film supply side thereof.

Referring to FIG. 1, it shows the appearance of a motion picture projector having incorporated therein a reel supporting device of the present invention and loaded with a cartridge having a reel spindle in itself. The cartridge, designated by reference numeral 1, contains therein a length of film rolled on a reel or like means and is positioned in place in the projector. A film take-up reel 2 is mounted on a reel spindle 2*a*. The film in the cartridge 1 may be threaded therefrom by film threading means and passed through a motion picture projecting part and then taken up by the take-up reel 2. A housing 3 houses therein the projecting part which comprises a projection light source, a projecting optical system, etc. A lens barrel 4 holds therein a picture projection lens forming a part of the projecting system. A drive roller 6 is carried by the projector body so as to be engageable with the reel 5 having the roll of film thereon and contained within the cartridge 1. The drive roller 6, during film supply, functions to rotate the reel 5 clockwise in FIG. 1 to advance the film, and during film rewind, functions to rotate the reel 5 counter-clockwise to rewind the film back into the cartridge. A guide roller 7 is cooperable with the drive roller 6 to assist the roller 6 in rewinding the film into the cartridge 1.

Figure 2:
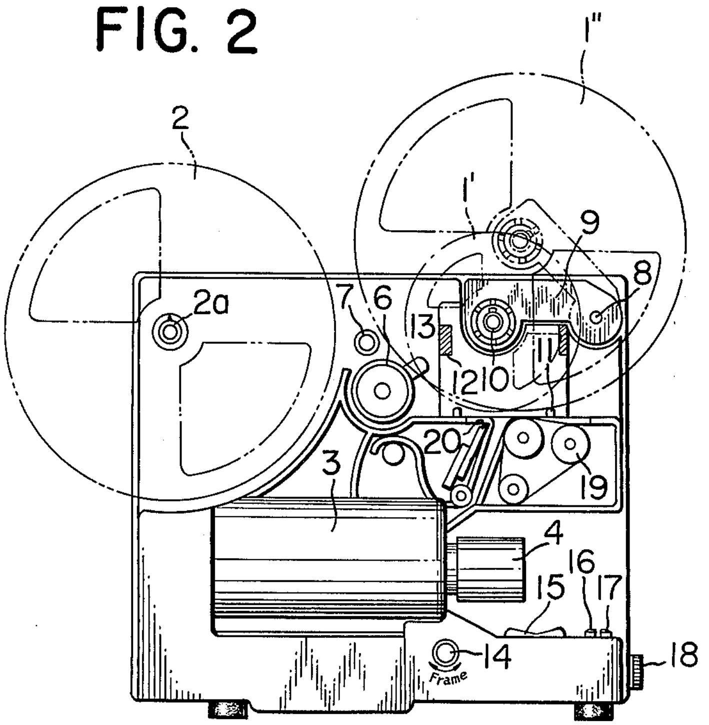
FIG. 2 is a pictorial front view of the same projector, but as loaded with an open reel at the film supply side thereof and with a side cover plate for a film threading mechanism removed therefrom to show such mechanism.

Turning to FIG. 2, the motion picture projector is shown with an open reel 1', instead of the cartridge 1, being mounted at the film supply side and with a side cover plate for the film threading mechanism being removed to show the mechanism. A shaft 8 is studded in the projector body and a reel supporting member 9 is pivotally mounted on the shaft 8. A supply reel supporting shaft 10 is provided for use when a cartridge provided with its own reel spindle is not in use, i.e. when an open reel is in use. The supply reel supporting shaft 10 is carried on the supporting member 9 and permits any different size of reel such as 1'' to be mounted as indicated by imaginary lines by adjusting the angular position of the supporting member about the pivot shaft 8. A positioning member 11 is provided to position a cartridge with respect to the projector, and a pair of latch members 12 may fix the positioned cartridge to the projector. In FIG. 1, the cartridge 1 is shown to be fixed in position to the projector by means of such positioning and latch members. A slot 13 is formed to guide the drive roller 6 when moved to its position for rewinding the film into the cartridge by unshown means. FIG. 2 further includes an operating member 14 for framing of the film, a main switch 15, an automatic projection start switch 16, a change-over switch 17 for "repeat" projection, and an operating knob 18 for tilting the projector. Numeral 19 designates conventional threading means adapted for pressure engagement with the perimeter of the film roll on the supply reel within the cartridge 1 or with the perimeter of the film roll on the open reel such as 1' or 1''. The threading means 19 is cooperable with conventional stripper means 20 for stripping the leader end portion of the film of the film roll to advance the leader end portion to a conventional film transport mechanism.

Figure 3A:
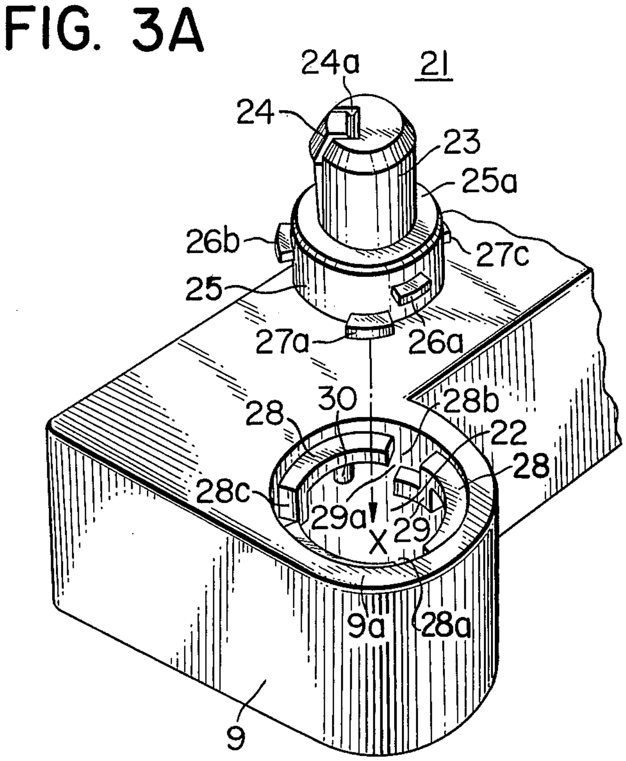
FIG. 3A is a perspective view illustrating the manner in which the reel supporting device of the present invention is mounted on the projector with the cylindrical reel supporting portion of the reel spindle of the device projected outwardly.
Figure 4A:
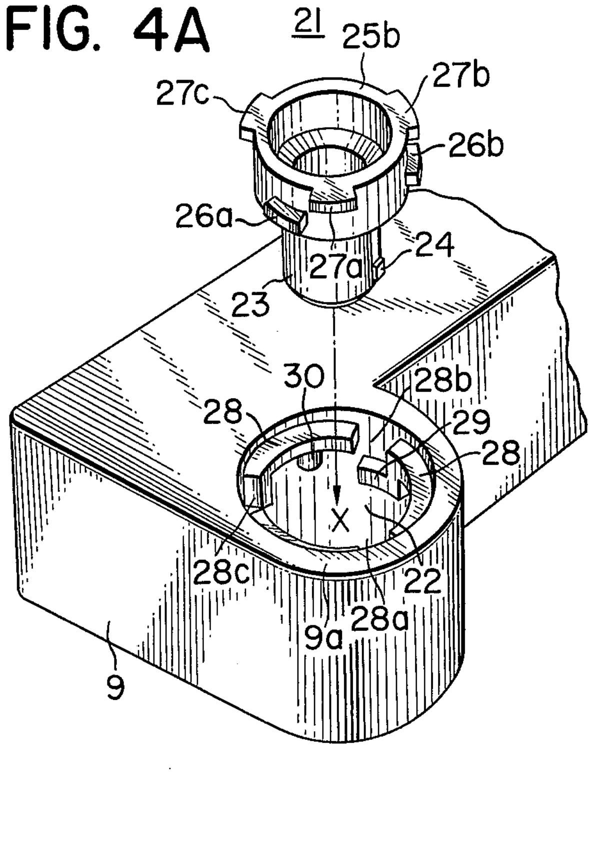
FIG. 4A is a perspective view illustrating the manner in which the reel spindle of FIG. 3 is inverted and mounted to the reel supporting member.

FIGS. 3A and 4A shown, to an enlarged scale, the essential portions of the reel supporting member 9 and the supply reel supporting shaft 10 in FIG. 1. In these figures, a reel spindle 21 forming the supply reel supporting shaft 10 is shown to be removed from a reel spindle mounting hole 22 in the reel supporting member 9, for the purpose of illustration.

The construction will first be described by reference to these figures. The reel spindle 21, which can be removably mounted on the reel supporting member 9, has a generally cylindrical portion 23 which may be fitted into a reel spindle receiving hole in an open reel to carry the reel thereon, and a mounting portion 25 which forms an extension of the cylindrical portion 23 and may be retractably fitted into a reel spindle mounting hole 22 formed in the reel supporting member 9 of the projector. Although the mounting portion 25 is shown to have a larger diameter than that of the cylindrical portion 23, the diameter of the portion 25 may be selected in accordance with the diameter of the reel spindle mounting hole 22 in the reel supporting member 9 and the shown configuration is not the only possible one. A reel keep portion 24 is provided by cutting away a part of the cylindrical portion 23 so as to provide a projection normally projected slightly outwardly beyond the outer periphery of the cylindrical portion, and the free end portion of the cylindrical portion 23 is tapered in the direction of the reel insertion, as shown. The diameter of the cylindrical portion 23 is slightly smaller than that of the reel spindle receiving hole in an open reel and the length of the reel mounting portion plus the reel keep portion is slightly greater than the effective length of said reel spindle receiving hole in the open reel, so that the open reel may be mounted on the cylindrical portion by forcing the reel onto such cylindrical portion with the reel keep portion inwardly yielding toward the axis of the cylinder 23 until the corresponding end of the reel bears against the shoulder 25*a* of the mounting portion 25, whereupon the reel keep portion 24 is free to resiliently restore its normal projected position to thereby support the reel rotatably. It will be noted that a gap 24*a* is provided in the radial direction of the cylindrical portion 23 and reel keep portion 24 so as to permit resilient displacement of the keep portion in the radial direction. However, such a reel keep portion may be replaced by any separate resilient member of the conventional type which may be attached to the cylindrical portion.

First reel spindle retainer means 26 comprises first retainer member 26*a*, 26*b* and 26*c* (26*c* being unseen in the drawing) formed integrally with and circumferentially of the mounting portion 25 adjacent the cylindrical portion 23 and spaced apart 120° from one another. Second retainer means 27 comprises second retainer members 27*a*, 27*b* and 27*c* formed integrally with and circumferentially of the mounting portion and disposed in spaced-apart and staggered relationship with said first retainer members in the axial directions of the mounting portion so as not to interfere with the insertion of the first retainer members into the mounting hole 22 in the supporting member 9. The number of the second retainer members is equal to that of the first retainer members, but the number itself may be singular or plural. First mating means 28 is formed integrally or fixedly on the inner wall surface of the hole 22 in the spindle supporting member 9 and adapted to mate with the mounting portion 25 of the described reel spindle 21. The first mating means 28 has cut-away portions 28*a*, 28*b* and 28*c* located to correspond to the retainer members 26*a* –26*c* or 27*a*–27*c* and engageable therewith. Second mating means 29, as many as the cut-away portions 28*a*–28*c*, are formed on the inner wall of the hole 22 in a predetermined spaced-apart relationship with the opening edge of the hole 22 so as to shut off the downward extensions of the cut-away portions. In the shown example, the first and second mating means 28 and 29 are connected together so as to form three sets of mating members with an opening or clearance 29*a* provided at a corner of each cut-away portion.

Such a reel spindle 21 may be simply molded in a one-piece form desirably by the use of poly-acetal resin or other synthetic resin.

Figure 3B:
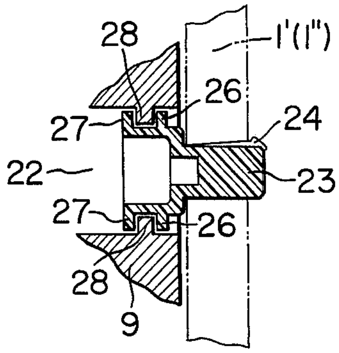
FIG. 3B is a fragmentary cross-sectional view of the reel spindle mounted to the reel supporting member in the manner illustrated in FIG. 3A.

How to mount the reel spindle 21 in the mounting hole 22 will now be explained by reference to FIGS. 3A and 3B. When the reel spindle 21 is downwardly inserted into the hold 22 in the direction as indicated by arrow in FIG. 3A, the second retainer members 27*a*, 27*b* and 27*c* on the mounting portion 25 will first bear against and stopped by the first mating means 28 if they are not in registry with the cut-away portions 28*a*, 28*b* and 28*c*. In such a case, the reel spindle may be turned about its axis to permit the retainer members 27*a*–27*c* to fit into the cut-away portions 28*a*–28*c* and accordingly allow the spindle 21 to enter the hole 22 until the shoulder surface 25*a* of the mounting portion 25 becomes flush with the surface 9*a* of the reel supporting member 9. In this position, the second retainer members 27*a*, 27*b* and 27*c* will now bear against the second mating means 29 to block any further entry of the reel spindle 21 into the hole 22. In this position, however, the spindle 21 can slip out of the mounting hole 22. To prevent this, the spindle 21 may be rotated counterclockwise in FIG. 3A until the first and second retainer means 26 and 27 of the spindle hold the first mating means 28 therebetween, thereby permitting rotation of the spindle 21. Thereafter, the second retainer means 27 will engage a stop 30 for limiting such rotation, whereupon the reel spindle 21 will finally be fixed in this position. FIG. 3B clearly shows such fixed position of the spindle. Thus, the cylindrical portion 23 is outwardly projected from the reel supporting member 9 and now ready to receive thereon a reel 1′ or 1″ having a hollowed center.

The above-described mounting system is known as the so-called "bayonet system," but it will be apparent that this is not the only possible way of mounting the reel spindle of the present invention, and any other conventional system may be employed which would permit ready mounting and dismounting while ensuring firm fixture of the spindle when mounted.

Figure 4B:
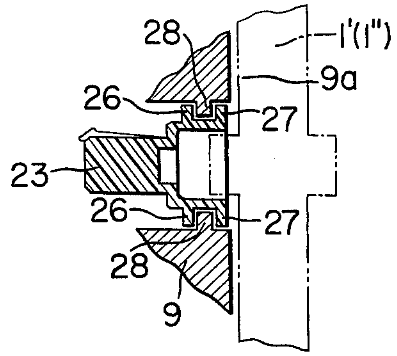
FIG. 4B is a fragmentary cross-sectional view of the reel spindle mounted to the reel supporting member in the manner illustrated in FIG. 4A.

The foregoing was the explanation to mount the reel spindle in such a manner that the cylindrical portion 23 is projected from the spindle mounting hole of the projector so as to permit the use of a film winder such as an open reel provided with no reel spindle of its own. In contrast, FIG. 4A shows a case where the reel spindle 21 is inverted and the cylindrical portion 23 thereof is then inserted fully into the spindle mounting hole 22 in the direction of arrow X, whereafter the same procedures as described previously take place to hold the first mating means 28 between the first and second retainer means of the mounting portion of the spindle. Once completely mounted, the spindle is in such a position as shown in FIG. 4B, where the rear end face 25*b* of the mounting portion 25 is maintained flush or slightly inward with respect to the surface 9*a* of the reel supporting member 9. Thus, a cartridge having a reel spindle in itself may be mounted in position without being affected in any way.

Figure 5:
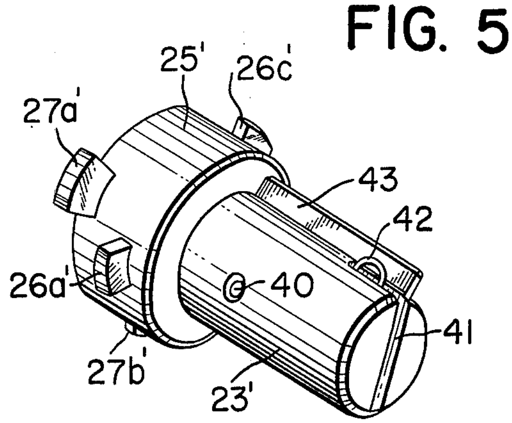
FIG. 5 shows, in perspective view, a modified form of the reel spindle according to the present invention.
Figure 6:
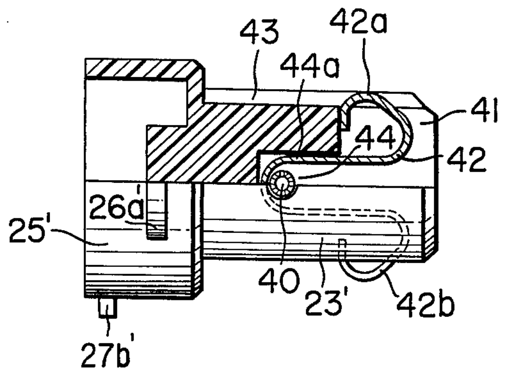
FIG. 6 is a side view, half in cross-section, of the reel spindle shown in FIG. 5.

FIGS. 5 and 6 illustrates a modified form of the reel spindle. The parts similar to those of FIGS. 3 and 4 are given similar reference numerals with a prime added thereto and description thereof is omitted. A spring 42 for holding a mounted reel is inserted into a split 41 formed axially in the forward end portion of the cylindrical portion 23′ of the reel spindle. The spring 42 is symmetrically configured with a pair of curled portions 42*a* and 42*b* slightly projected outwardly of the cylindrical member 23′. As best seen in FIG. 6, the split 41 is inwardly stepped to provide an inner split 44 having an inner wall 44*a*, against which the base of the spring 42 bears and is urged thereby so as to be inwardly curved. The innermost curved end of the spring is secured to the spindle by means of a pin 40. Axially on the cylindrical portion 23′, a spline 43 is formed for engagement with a complementary groove formed in the inner wall of the spindle receiving hole in a reel to prevent relative displacement of the reel and the spindle once the reel is inserted over the spindle.

The reel spindle shown in FIGS. 5 and 6 may be mounted to the reel supporting member 9 in the manner as described with respect to FIGS. 3A and B or FIGS. 4A and B.

It will thus be seen that the reel supporting device for motion picture projectors according to the present invention permits two different modes of mounting of the spindle with respect to the reel supporting member rotatably supported on the projector. In one of the two modes, the spindle is mounted with the cylindrical portion thereof for supporting an open reel being projected outwardly from the mounting hole in the supporting member, and in the other mode, the entire spindle is fully inserted in the mounting hole. Any of these two modes of mounting may be selected by the use of a single common reel spindle member as desired. Thus, the reel supporting device of the present invention eliminates the need to use only one of a cartridge and an open reel in accordance with the type of the motion picture projector and permits a cartridge or an open reel to be selectively used with a common projector. In addition, when a cartridge is used, the reel spindle of the present invention can be simply inverted and inserted into a predetermined reel spindle position and this is useful to avoid missing of such reel spindle.

I claim:

1. In a motion picture projector capable of being loaded with either a film cartridge having its own reel spindle therein or an open reel having a reel spindle receiving hole therein, a device for selectively accommodating said cartridge or supporting said open reel comprising:

reel spindle means having a cylindrical portion adapted to be inserted into the reel spindle receiving hole formed in said open reel, a mounting portion formed as an extension of said cylindrical portion and adapted to be mounted on said motion picture projector, and a plurality of retainer members projected outwardly at the circumference of the mounting portion, said reel spindle means having a first mounting position on said motion picture projector wherein said mounting portion is mounted on the motion picture projector in such a manner that said cylindrical portion projects outwardly from the projector for supporting said open reel and a second mounting position on said motion picture projector wherein said mounting portion is mounted in the inverted direction with respect to the first mounting position so as to insert said cylindrical portion into said projector, for permitting the loading of said film cartridge; and reel supporting means provided on said motion picture projector to removably mount said reel spindle means thereon, said supporting means having a mounting hole having a first portion for receiving said cylindrical portion of said reel spindle means, and a second portion, constituting an extension of said first portion, for mounting said mounting portion of said reel spindle means, a plurality of mating members being provided in the inner wall of said second portion of said mounting hole and being located to correspond to said retainer members of said reel spindle means, said mating members being engageable with said retainer members in said respective first and second mounting positions, whereby said reel supporting means is enabled to support said open reel when said reel spindle means is mounted in said hole in its first mounting position and is enabled to accommodate said film cartridge as loaded into said projector when said reel spindle is mounted in said hole in its second mounting position.

2. A device according to claim 1, wherein said reel spindle means further includes a resilient member normally projected outwardly from the outer peripheral surface of said cylindrical portion and yieldable inwardly of said cylindrical portion by an extraneous force.

3. A device according to claim 1, wherein said reel supporting means further includes a stop member for preventing rotation of said reel spindle means beyond a predetermined angle when said mounting portion of said reel spindle has been inserted into said mounting hole.

4. A device according to claim 1, wherein said reel supporting means further includes a member for pivotally mounting said reel supporting means on said motion picture projector in accordance with the diameter of said reel.

5. A device for rotatably supporting a reel on a motion picture projector comprising:

a reel spindle separate from said motion picture projector and removable mountable on said projector when in use with a film cartridge having its own reel spindle therein;

said removably mountable reel spindle having a cylindrical portion of a predetermined diameter to rotatably support said reel, a mounting portion of a larger diameter than that of said cylindrical portion and adapted to be mounted on said motion picture projector, and a first portion of a reversible bayonet coupling provided on said mounting portion; and supporting means provided on said motion picture projector for removably mounting said reel spindle thereon, said supporting means having a mounting hole having a first portion of a predetermined diameter mounting said mounting portion of said reel spindle and a second portion provided as an extension of said first hole portion to receive said cylindrical portion of said reel spindle when said film cartridge is in use on the projector, and a second portion of said reversible bayonet coupling provided on the inner wall of said first portion of said hole and engageable with said first bayonet coupling portion of said spindle;

said removably mountable reel spindle having a first mounting mode wherein said mounting portion is mounted in said first portion of said mounting hole by the engagement of the first and second portions of said bayonet coupling with said cylindrical portion of the spindle projected outwardly from said supporting means for rotatably supporting said reel and a second mounting mode wherein said mounting portion is invertedly mounted in said first portion of said mounting hole by the engagement of the first and second portion of said bayonet coupling with said cylindrical portion of the spindle received within said second portion of said mounting hole of the supporting means for permitting the use of said film cartridge.

6. A motion picture projector capable of being loaded with various sized reels with or without a built-in reel spindle, comprising:

reel supporting means having a supporting member adjustable in accordance with the diameter of a reel, said reel supporting means further having a reel spindle of fixed length removably mountable on said supporting member;

said removably mountable reel spindle includng a reel supporting portion adapted to mate with a spindle receiving hole provided in at least some of said reels, a mounting portion formed as an extension of said reel supporting portion, and engaging portions for mounting said removably mountable spindle to said supporting member;

said supporting member including a reel spindle mounting hole capable of receiving the entire length of said removably mountable reel spindle, and mating portions formed in the inner wall of said mounting hole and engageable with said engaging portions of said reel spindle in each of a first and a second mounting mode, in said first mode, the reel supporting portion projects outwardly from said supporting member to support a reel not provided with its own built-in spindle and in said second made, said supporting member receives the entire length of said removably mountable reel spindle in said mounting hole while engaging the mating portions with the engaging portions, invertedly of the first made of mounting, so as to accommodate a reel having its own reel spindle therein.

7. A motion picture projector capable of being loaded at different times with film cartridges of different types, one of which types has a built-in reel spindle and the other of which has a reel spindle receiving hole, comprising:

means for fixing said film cartridge in a predetermined position on said motion picture projector;

reel spindle means removably provided at a location where said film cartridge is to be mounted, said reel spindle means having a first mounting mode for rotatably supporting a reel in a film cartridge having no reel spindle therein, and a second mounting mode in which said reel spindle means of the projector is stored within said projector without projecting into said cartridge-fixing predetermined position, said reel spindle means of the projector having a reel supporting portion adapted to mate with a spindle receiving hold in said film cartridge, and a mounting portion adapted to mount on said projector; and reel spindle mounting means provided adjacent to said cartridge-fixing predetermined position, said mounting means having an engaging cavity portion adapted to be removably engageable with said mounting portion of said reel spindle means for secure support thereof and a receiving portion provided as an extension of said engaging cavity portion with a length suited to receive the reel supporting portion of said reel spindle means when said reel spindle means is mounted in said second made in said engaging cavity portion and stored as aforesaid, whereby said reel spindle means is capable of rotatably supporting the reel in a cartridge with said reel supporting portion projecting from the cartridge mounting position in said first mounting mode, and permits the mounting of a cartridge at the predetermined position of the projection, with said reel supporting portion being received in said receiving portion of said cavity in said second mounting mode.

8. A device for supporting a reel capable of carrying a roll of strip material thereon and having a spindle receiving hole therein, and capable of accommodating a cartridge having its own spindle in place of a reel so supported, comprising:

reel supporting means movable to various positions for respectively mounting reels of different diameter selectively, said supporting means being movably mounted on a base and having a mounting receiving a spindle; and a reel spindle adapted to mate with said spindle receiving hole of a reel for rotatably supporting said reel and capable of being removably and reversibly mounted in said mounting hole of said reel supporting means;

said reel spindle having a reel mating portion for mating with said spindle receiving hole of said reel, a reel spindle mounting portion formed as an extension of said mating portion, and first and second retaining members formed in the outer wall of said mounting portion and longitudinally and angularly spaced apart from each other;

said mounting hole having a portion for receiving said mounting portion of said reel spindle and provided with first and second mating members formed in the inner wall of said mounting hole and engageable with said first and second retaining members of said reel spindle, and having also an axial extension for receiving said reel mating portion of the spindle when said spindle is in position for accommodating a cartridge as aforesaid;

said reel spindle having a first mounting mode in which said mounting portion is mounted in said mounting hole with said reel mating portion of the spindle projecting outwardly from said reel supporting means for supporting said reel and a second mounting mode in which said mounting portion is invertedly mounted in said mounting hole with said reel mating portion of the spindle inwardly received in said extension of said mounting hole for accommodating a cartridge having its own spindle as aforesaid.

* * * * *